P. Geier.
Bung.
N°. 87,163. Patented Feb. 23, 1869.
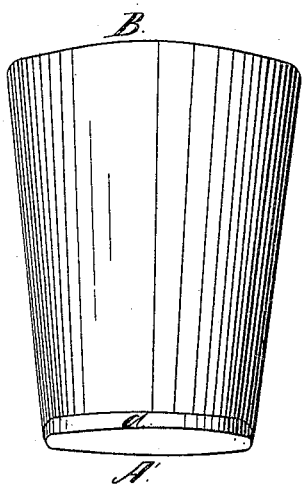
Witnesses:
William Bauer
Saml Knight
Inventor:
Philip Geier
By Knight Bros
Attys

PHILIP GEIER, OF CINCINNATI, OHIO.

Letters Patent No. 87,163, dated February 23, 1869.

IMPROVED MODE OF RENDERING WOODEN BUNGS IMPERVIOUS TO LIQUIDS AND GASES

The Schedule referred to in these Letters Patent and making part of the same

*To whom it may concern:*

Be it known that I, PHILIP GEIER, of Cincinnati, Hamilton county, Ohio, have invented a new and useful Improvement in Wooden Bungs; and I hereby declare the following to be a full, clear, and exact description thereof, reference being had to the accompanying drawings, making part of this specification.

My invention consists in rendering wooden bungs impervious to the passage of gases of beer or other liquor through the pores of the wood, by means of any suitable substance.

The drawing shows a bung, whose smaller end, A, has a coat of impervious material, a, its larger end, B, being left uncoated.

The substance at present used by me in preference to any other is paraffine. This substance I heat to, at, or near the boiling-point and immerse the required portion of the bung therein a sufficient time to absorb the required amount of paraffine, and to coat its surface.

I claim herein as new, and of my invention—

A wooden bung, rendered impervious to the passage of fluids through the pores of the wood, by means of the described or other suitable substance.

In testimony of which invention, I hereunto set my hand.

PHILIP GEIER.

Witnesses:
GEO. H. KNIGHT,
JAMES H. LAYMAN.